Patented Sept. 4, 1951

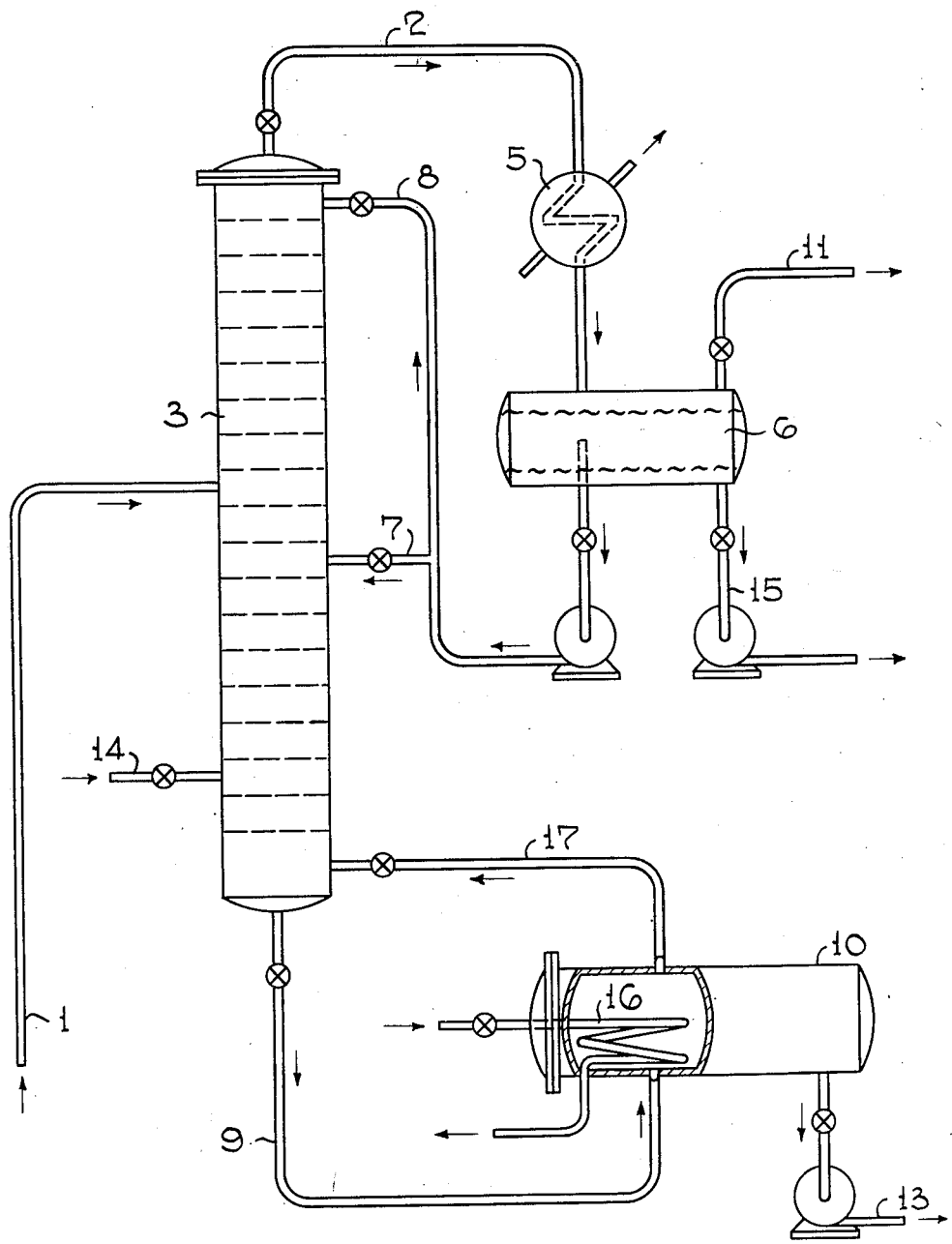

2,566,992

UNITED STATES PATENT OFFICE 2,566,992

MANUFACTURE OF IMIDES

Jerome Perry Morgan, Maplewood, and Ernest O. Ohsol, Cranford, N. J., assignors to Standard Oil Development Company, a corporation of Delaware Application November 6, 1948, Serial No. 58,754

8 Claims. (Cl. 260—326)

This invention relates to an improved process for making organic imides and more particularly to an improved process for making organic imides of dicarboxylic acids from organic acid anhydrides and ammonia.

The usual method of preparing an organic imide of a dicarboxylic acid such as phthalimide from phthalic anhydride is a batch operation consisting essentially of:

1. Treating solid anhydride with aqueous ammonia to form an intermediate compound, the ammonium salt;
2. Heating the mixture to remove the water;
3. Applying additional heat to maintain the residue in molten state and to drive off ammonia and water from the intermediate compound to yield the desired imide. This method is time consuming, cumbersome, and expensive.

This invention comprises a simplified, unitary, continuous process for the production of organic imides of dicarboxylic acids in which simultaneous ammoniation, dehydration, and recovery of concentrated imides are accomplished in a single treating zone. The process of this invention is therefore ideally adapted to overcome the before-mentioned difficulties.

The imides that can be produced by the process of this invention comprise the organic imides of dicarboxylic acids such as for example, tetrahydrophthalimide, phthalimide, succinimide and endomethylenetetrahydrophthalimide and substituted derivatives of these compounds where the substituent radicals are attached to nuclear carbon atoms, i. e., menthyl phthalimide. If desired, mixtures of the imides can also be prepared by the process of this invention.

The reactants employed comprise the acid anhydrides of the dicarboxylic acids of the desired imide and ammonia, the latter preferably in the anhydrous vapor form.

While the dicarboxylic anhydrides may be supplied to the treating zone directly in the molten state, it is preferred to incorporate them into a solution with an organic solvent. The organic solvents utilized in this invention consist of substantially water immiscible solvents which besides having the desired solubilizing action on the anhydrides, also have the property of entraining water through the formation of azeotropic mixtures with the latter. This consequently facilitates the removal of the water formed by the reaction. The organic solvents also function to prevent clogging of the treating zone by solid intermediate products such as ammonium salts and semi-imides. Among the particular solvents that can be utilized in this invention are the xylenes, benzene, toluene, ethylbenzene, iso-octane, and various non-olefinic hydrocarbon fractions. These solvents are inert under the reaction conditions. Other non-reactive organic solvents not of the hydrocarbon type may be also utilized, such as chlorobenzene, diethylketone, and various ethers. Mixtures of solvents may also be employed.

The operation of the process of this invention consists in adding the desired anhydrides to an intermediate portion of a treating zone which functions also as a fractionating tower. Anhydrous vaporous ammonia is continuously passed into the column at a lower portion. The anhydride preferably in the form of a solution passes down the column from the feed plate, countercurrent to the flow of ammonia. The anhydride is converted to the imide directly or indirectly via the ammonia salt as it descends the tower. The ascending solvent vapor entrains the water formed and removes it overhead, enabling the reaction to proceed to completion.

The reaction is accompanied by the liberation of an appreciable amount of heat which serves the useful purpose of bringing the materials to the desired temperature level at the lower portion of the reactor, below the feed, i. e., 180°–275° C. for tetrahydropthalimide, for a rapid, complete reaction. Additional heat may be added if required at the bottom of the tower.

This invention will be better understood by reference to the flow diagram shown in the drawing.

A mixture of tetrahydrophthalic anhydride and an equal amount of xylenes heated to 80° C. just below the boiling point of the solvent at 100 mm. pressure is fed through line 1 to an intermediate portion of bell cap tower 3 maintained at the indicated subatmospheric pressure. Anhydrous ammonia vapor enters a lower portion of the tower 3 through line 14. A countercurrent operation is thereby set up.

In the upper part of the tower 3 there is a vaporous mixture of xylene and water vapor which is removed overhead through line 2 as the azeotrope along with excess ammonia vapor. This vaporous mixture is cooled and condensed in condenser 5 at a temperature of about 30° C. at which point the water and xylenes are condensed but a considerable portion of the ammonia remains in the vapor state. This partially condensed mixture is then sent to separator tank 6 from which the water layer is removed through line 15 and the xylene layer is recycled to tower 3 through inlets 7 and 8. The ammonia is removed from separator 6 through pressure control line 11. The uncondensed ammonia together with ammonia stripped from the discarded water condensate may be recycled to the lower portion of tower 3 by means of a compressor or booster if desired. It is especially advantageous to introduce a substantial portion of the xylene reflux at inlet 7 below the point of entry of the feed inlet 1 in order to insure dehydration of the anhydride before it reaches the bottom of the column. This portion of the solvent may be prevaporized and injected as a vapor, thus supplying a major portion of the heat required for the operation of the tower.

The anhydride feed flows countercurrent to the ascending ammonia vapors. The tower is so designed that the liquid is maintained in a high degree of turbulence to favor uniform distribution of the reactants. Caution should be taken to avoid pockets of stagnant liquid and channelling. The lower, hotter part of the tower 3 serves as a stripping zone to remove the xylene from the descending product and to decompose any ammonium salts formed. From bottom outlet 9 there is removed molten, anhydrous, relatively pure tetrahydrophthalimide.

After the bottoms temperature has been increased to a temperature intermediate to the melting and boiling point of tetrahydrophthalimide at the pressure condition present bottoms withdrawal can be started. This bottoms is largely molten tetrahydrophthalimide and can be withdrawn at a weight rate only slightly lower (about 99%) than that of the feed excluding solvent. The principal contaminants are unreacted anhydride, amides and small amounts of tarry materials. The latter substances can be minimized by operation at subatmospheric pressures and at lower temperatures.

The tower is operated with a temperature gradient, with the hottest region at the bottom and the coolest region at the top, i. e., 240° to less than 100° C. for tetrahydrophthalimide with xylenes as the solvent. The higher temperature is determined by the temperature necessary to melt the desired product and to advance the speed of reaction.

The molten tetrahydrophthalimide is taken to reboiler 10 containing heating coil 16. Some tetrahydrophthalimide is vaporized and recycled through vapor line 17. As an alternate design for atmospheric pressure operation a heating coil may be located in the bottom of the column. The reboiler 10 supplies the additional heat necessary for the operation of the tower. When part of the solvent is introduced as vapor below the feed at inlet 7, the reboiler need only supply the heat necessary to strip the residual solvent from the tetrahydrophthalimide and decompose any ammonium salts formed.

As a product, the solvent free molten tetrahydrophthalimide is removed through line 13.

One advantage of the process of this invention is the resulting more complete utilization of the ammonia.

Another advantage of the process of this invention is the more complete utilization of the acid anhydrides.

Another advantage resides in the diminished reaction time necessary in the process of this invention.

Another advantage resides in the lessened temperature and heat requirements as compared to the prior art with consequent greater yields due to diminished resinification of the imide products.

It is to be understood that this invention is not limited to the specific embodiments which have been offered merely as illustrations and that modifications may be made without departing from the spirit of the invention.

What is claimed is:

1. A continuous process for the preparation of an organic imide of a dicarboxylic acid which comprises the steps of continuously introducing an anhydride of the corresponding dicarboxylic acid into an intermediate portion of a fractionating zone, continuously refluxing within the fractionating zone at a temperature below the boiling point of the anhydride an organic solvent for the anhydride, said organic solvent being capable of azeotroping with water; feeding ammonia gas into a lower portion of the fractionating zone; withdrawing overhead a vaporous mixture of water-organic solvent azeotrope and ammonia and continuously recovering the organic imide which has been heated to a temperature above its melting point but below its boiling point in a molten state from a bottom portion of the fractionating zone.

2. A process as in claim 1 in which the fractionating zone is operated at subatmospheric pressures.

3. A continuous process for the preparation of an organic imide of a dicarboxylic acid which comprises the steps of continuously introducing a solution of an anhydride of the corresponding dicarboxylic acid in an organic solvent to an intermediate portion of a fractionating zone, said organic solvent being capable of forming an azeotrope with water; continuously refluxing the organic solvent within the fractionating zone at a temperature below the boiling point of the anhydride; feeding ammonia gas into a lower portion of the fractionating zone; withdrawing overhead a vaporous mixture of water-organic solvent azeotrope and ammonia; cooling the vaporous mixture to condense the water and organic solvent; separating the components of the partially condensed vaporous mixture; returning the separated organic solvent to the fractionating zone and continuously withdrawing the organic imide which has been heated to a temperature above its melting point but below its boiling point in a molten state from a bottom portion of the fractionating zone.

4. A process as in claim 3 in which part of the separated organic solvent is returned to an upper portion of the fractionating zone and a part of the organic solvent is returned to a portion of the fractionating zone intermediate to the points of entry of the anhydride and the ammonia.

5. A process as in claim 4 including the additional step of recycling the separated ammonia vapor from the separation step to the lower portion of the fractionating zone.

6. A continuous process for the preparation of tetrahydrophthalimide which comprises the steps of continuously introducing tetrahydrophthalic anhydride in a xylene solution to an intermediate portion of a fractionating zone; continuously refluxing xylene within the fractionating zone; feeding anhydrous ammonia gas into a lower portion of the fractionating zone; withdrawing overhead a vaporous mixture of water-xylene azeotrope and ammonia; cooling the vaporous mixture to condense the water and the xylene; separating the components of the partially condensed vaporous mixture; returning a part of the separated xylene to an upper portion of the fractionating zone and another part of the separated xylene to a portion of the fractionating zone intermediate to the points of entry of the tetrahydrophthalic anhydride and the ammonia; recycling the separated ammonia vapor from the separation step to the lower portion of the fractionating zone and continuously withdrawing tetrahydrophthalimide in a molten state as bottoms from the fractionating zone.

7. A process as in claim 6 in which the fractionating zone is operated at subatmospheric pressure.

8. A continuous process for the preparation of tetrahydrophthalimide, which comprises the steps of continuously flowing molten tetrahydrophthalic anhydride countercurrently to anhydrous ammonia vapor in a lower part of a fractionation zone, continuously refluxing xylene within the fractionation zone, maintaining said lower part of the fractionation zone at a temperature in the range of 180° C. to 275° C. for rapid reaction of said anhydride in a molten state with the ammonia, withdrawing a vaporous mixture of water vapor, excess ammonia vapor with an azeotropic proportion of xylene vapor from the lower part of the fractionation zone through an upper part of the fractionation zone, continuously refluxing in the upper part of said fractionation zone an amount of xylene sufficient to form an azeotropic composition with water vapor evolved in the lower part of said fractionation zone, and continuously withdrawing molten tetrahydrophthalimide which has been heated to a temperature above its melting point but below its boiling point as bottoms from said lower part of the fractionation zone.

JEROME PERRY MORGAN.
ERNEST O. OHSOL.

REFERENCES CITED

The following references are of record in the file of this patent:

UNITED STATES PATENTS

| Number | Name | Date |
|---|---|---|
| 1,966,068 | Jaeger et al. | July 10, 1934 |
| 2,351,939 | Drossbach et al. | June 20, 1944 |
| 2,393,999 | McCrone | Feb. 5, 1946 |
| 2,405,559 | Bousquet | Aug. 13, 1946 |